(12) United States Patent
Dix (10) Patent No.: US 11,224,154 B2
(45) Date of Patent: Jan. 18, 2022

(54) HEADLAND TURN PLANNING FOR A WORK VEHICLE

(71) Applicant: CNH INDUSTRIAL AMERICA LLC, New Holland, PA (US)

(72) Inventor: Peter John Dix, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 215 days.

(21) Appl. No.: 16/357,605

(22) Filed: Mar. 19, 2019

(65) Prior Publication Data

US 2020/0296878 A1    Sep. 24, 2020

(51) Int. Cl.
| | |
|---|---|
| A01B 69/04 | (2006.01) |
| B62D 6/00 | (2006.01) |
| B62D 15/02 | (2006.01) |
| G05D 1/02 | (2020.01) |
| G01C 21/20 | (2006.01) |

(52) U.S. Cl.
CPC ............ A01B 69/008 (2013.01); B62D 6/002 (2013.01); B62D 15/029 (2013.01); G01C 21/20 (2013.01); G05D 1/0278 (2013.01); G05D 1/0291 (2013.01); G05D 2201/0201 (2013.01)

(58) Field of Classification Search
None
See application file for complete search history.

(56) References Cited

U.S. PATENT DOCUMENTS

| | | | |
|---|---|---|---|
| 6,144,910 A | 11/2000 | Scarlett et al. | |
| 6,336,051 B1 | 1/2002 | Pangels et al. | |
| 7,502,678 B2 | 3/2009 | Diekhans et al. | |
| 7,689,356 B2 | 3/2010 | Dix et al. | |
| 7,715,979 B2 | 5/2010 | Dix | |
| 7,747,370 B2 | 6/2010 | Dix | |
| 8,060,299 B2 | 11/2011 | Gharsalli et al. | |
| 8,145,390 B2 | 3/2012 | Dix et al. | |

(Continued)

FOREIGN PATENT DOCUMENTS

EP    3127782 A1    2/2017

OTHER PUBLICATIONS

Trimble, "Trimble Launches NextSwath End-of-RowTurn Technology to Improve Operator Performance and Crop Yield for Agriculture", http://investor.trimble.com/news-releases/news-release-details/trimble-launches-nextswath-end-row-turn-technology-improve, Apr. 27, 2015 (3 pages).

*Primary Examiner* — Todd Melton
(74) *Attorney, Agent, or Firm* — Rebecca L. Henkel; Rickard K. DeMille (57) ABSTRACT

A work vehicle guidance system includes a control system that has a controller having a processor and a memory. The control system is configured to determine a relative location of a work vehicle to a work area. Moreover, the control system is configured to determine an end-of-row turn path for the work vehicle based at least on the relative location of the work vehicle and a minimum turning radius of the work vehicle. The end-of-row turn path is configured to direct the work vehicle to turn from a first main swath of the work area to a headland swath of the work area, travel along the headland swath in direction toward a second main swath of the work area, and turn from the headland swath to the second main swath. Further, the control system is configured to output a guidance signal comprising guidance instructions to implement the end-of-row turn path.

18 Claims, 5 Drawing Sheets

(56) References Cited

U.S. PATENT DOCUMENTS

| | | | |
|---|---|---|---|
| 8,209,075 B2 | 6/2012 | Senneff et al. | |
| 8,346,443 B2 | 1/2013 | Senneff et al. | |
| 8,738,238 B2 * | 5/2014 | Rekow | A01B 69/008 701/50 |
| 9,002,566 B2 | 4/2015 | McClure et al. | |
| 9,020,757 B2 * | 4/2015 | Peake | B62D 6/00 701/500 |
| 9,526,199 B2 | 12/2016 | Matsuzaki et al. | |
| 9,708,001 B2 * | 7/2017 | Arakane | B62D 6/006 |
| 9,795,074 B2 * | 10/2017 | Stratton | A01B 79/005 |
| 9,974,225 B2 * | 5/2018 | Bunderson | G05D 1/0223 |
| 10,368,475 B2 * | 8/2019 | Wolters | G05D 1/0217 |
| 2008/0249692 A1 | 10/2008 | Dix | |
| 2015/0331423 A1 | 11/2015 | Volger et al. | |
| 2019/0146513 A1 * | 5/2019 | Tomita | G05D 1/0278 701/50 |

* cited by examiner

HEADLAND TURN PLANNING FOR A WORK VEHICLE

BACKGROUND

The disclosure relates generally to a work vehicle guidance system, and more particularly to generating and implementing end-of-row turn paths for a work vehicle.

Work vehicles (e.g., tractors, sprayers, harvesters, etc.) are commonly used in a variety of agricultural tasks (e.g., to tow planters or seeders for planting seeds, to tow spraying implements for applying fertilizer, for harvesting agricultural product, etc.). Traditionally, work vehicles are manually operated by an operator. That is, the steering and speed of the work vehicle is controlled by an operator driving the work vehicle. Recent developments integrating GPS-based navigation systems into work vehicle control systems have enabled automatic or semi-automatic steering and/or speed control of work vehicles. For example, some work vehicles may include a control system configured to automatically direct the work vehicle to follow a path along swaths (e.g., rows) within a main portion of a field. The path may include headland turns between swaths that pass through a headland region of the field. In some fields, agricultural product is planted in both the main portion of the field and the headland region of the field. The headland turn portion of the path may cause the work vehicle to traverse untracked portions of the headland region, which may hinder agricultural product growth in the untracked portions of the headland region. For example, due to the weight of the work vehicle, a path through an untracked portion of the headland region may compact soil in the untracked portion, thereby reducing crop yield in the untracked portion of the headland region.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a work vehicle guidance system includes a control system that has a controller having a processor and a memory. The control system is configured to determine a relative location of a work vehicle to a work area. Moreover, the control system is configured to determine an end-of-row turn path for the work vehicle based at least on the relative location of the work vehicle and a minimum turning radius of the work vehicle. The end-of-row turn path is configured to direct the work vehicle to turn from a first main swath of the work area to a headland swath of the work area, travel along the headland swath in direction toward a second main swath of the work area, and turn from the headland swath to the second main swath. Further, the control system is configured to output a guidance signal comprising guidance instructions to implement the end-of-row turn path.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, not all features of an actual implementation may be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In many agricultural operations, work vehicles are commonly used to perform a variety of tasks (e.g., towing planters or seeders for planting seeds, towing spraying implements for applying fertilizer, harvesting agricultural product, plowing, preparing beds, etc.) within a work area (e.g., agricultural field). The work vehicle may include an agricultural implement (e.g., combines, windrowers, forage harvesters, sugar cane harvesters, etc.), or may tow an agricultural implement.

The work vehicle may also include a control system that guides the work vehicle in the work area along a swath (e.g., row in the agricultural field) and/or along an end-of-row turn (e.g., a path between swaths within the agricultural field). In some work vehicles, end-of-row turns are executed manually. For example, when the work vehicle reaches the end of a first main swath, the operator raises, deactivates, and/or otherwise disengages the agricultural implement; the operator then manually controls the speed and steering of the work vehicle to guide the work vehicle through the end-of-row turn connecting the end of the first main swath to the beginning of a second main swath. The operator then lowers, activates, and/or otherwise engages the agricultural implement, and an automatic or semi-automatic control system guides the work vehicle along the second main swath. Unfortunately, traditional end-of-row turns may hinder crop growth in a headland region. For example, as the work vehicle travels along an untracked portion of a headland region during an end-of-row turn, portions of the work vehicle (e.g., wheels, tracks, etc.) may compact the soil of the untracked headland portion, which may reduce crop yield. In some embodiments, the work agricultural implement may be activated in the headland region to perform work on crops planted in the headland region.

Present embodiments of the control system may generate an end-of-row turn path for the work vehicle that reduces soil compaction in the headland region. The control system may take into account a number of factors (e.g., previous end-of-row turn paths, minimum turning radius, maximum turning rate, starting point, initial heading, speed, fuel consumption, etc.) in determining the end-of-row turn path. The reduced compaction is caused by following a tracked portion of the headland region during an end-of-row turn path. The control system may generate the end-of-row turn path to follow tracked portions of the headland regions formed by previous end-of-row turn paths, based the factors set forth above, to reduce formation of additional tracked portions in the headland region. In some embodiments, the control system may implement the end-of-row turn path (e.g., automatically guide the work vehicle along the end-of-row turn path). Advantages of the disclosed embodiments include the generation of an end-of-row turn path with minimal travel along untracked portions of a headland region, thereby reducing soil compaction in the headland region. As a result, the efficiency of the agricultural operation may be increased.

Figure 1:
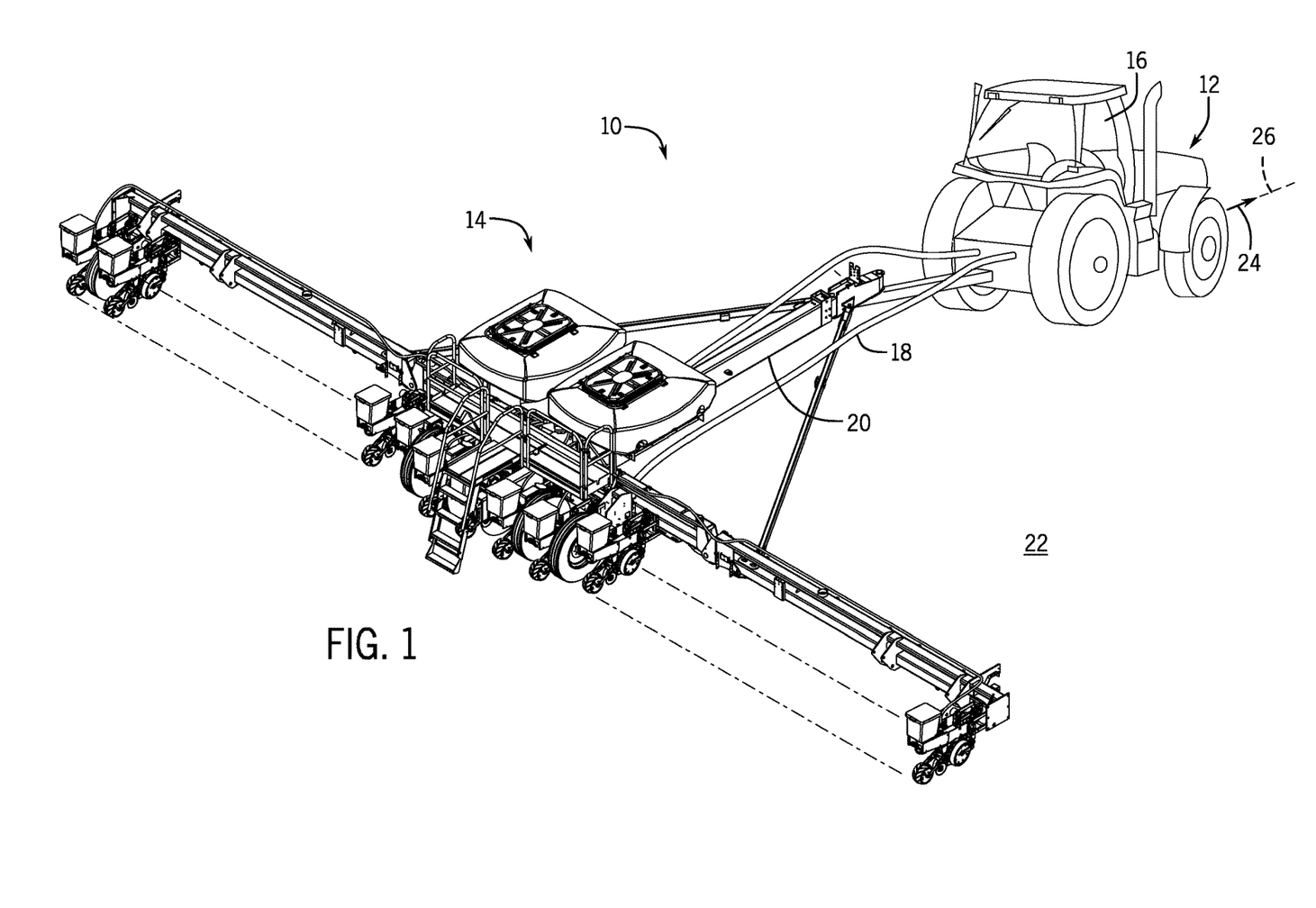
FIG. 1 is a perspective view of an embodiment of an agricultural system.

FIG. 1 is a perspective view of an embodiment of an agricultural system 10. The agricultural system 10 includes a work vehicle 12 and an agricultural implement 14. In some embodiments, the agricultural implement 14 may be towed behind the work vehicle 12 (e.g., as shown in FIG. 1). In other embodiments, the agricultural implement 14 may be incorporated into the work vehicle 12 (e.g., such as a combine, a windrower, a forage harvester, a sugar cane harvester, etc.). The work vehicle 12 may be any vehicle suitable for towing the agricultural implement 14, such as a tractor, off-road vehicle, work vehicle, or the like. In the illustrated embodiment, the work vehicle 12 includes a cab 16, in which an operator sits during operation of the work vehicle 12. The cab 16 may be an open or closed cab 16. In another embodiment, the work vehicle does not have a cab. Instead, the work vehicle is remotely controlled. Additionally, the agricultural implement 14 may be any suitable implement, such as a ground-engaging implement (e.g., a soil conditioner, a tillage implement, a fertilizer application implement, a planter, a seeder, etc.) or a sprayer/applicator, suitable for agricultural use. The agricultural implement 14 is coupled to the work vehicle 12 via a hitch 18. In one embodiment, the hitch 18 may be a three-point hitch that rigidly couples the implement 14 to the vehicle 12, and enables the implement 14 to move upwardly and downwardly. In another embodiment, the implement 14 may be coupled to the vehicle 12 via a drawbar, enabling the implement 14 to move upwardly, downwardly, and to rotate with respect to the vehicle 12. However, in other embodiments, the implement 14 may be coupled to the vehicle 12 via any suitable system. In some embodiments, the implement 14 may be coupled to the front of the vehicle 12. In the illustrated embodiment, a frame 20 of the implement 14 is coupled to the work vehicle 12 via the hitch 18. The work vehicle 12 is configured to travel over a work area 22, such as the ground, a road, a field, or another surface. The work vehicle 12 is configured to tow the agricultural implement 14 in a direction of travel 24 along a path 26.

Figure 2:
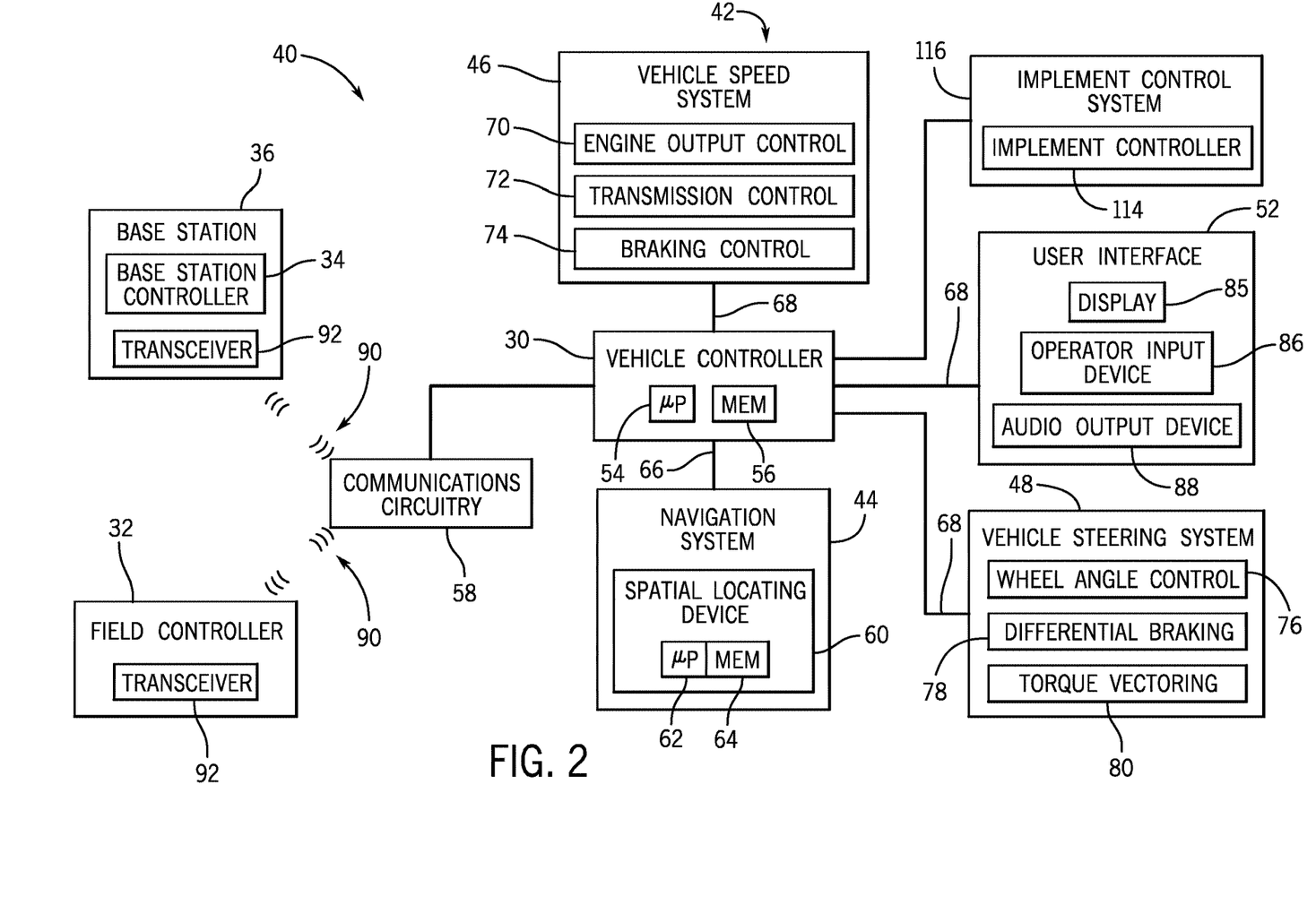
FIG. 2 is a schematic view of an embodiment of a vehicle control system of the agricultural system of FIG. 1.

FIG. 2 is a block diagram of an embodiment of a control system 40 of the agricultural system 10 of FIG. 1. In the illustrated embodiment, the control system 40 includes a work vehicle control system 42 having a vehicle controller 30, a navigation system 44, a vehicle speed system 46, a vehicle steering system 48, and a user interface 52. However, other embodiments of the control system 40 may include different elements in alternative combinations.

The vehicle controller 30 includes a processor 54, and a memory device 56. The processor 54 may include one or more general-purpose processors, one or more application specific integrated circuits, one or more field programmable gate arrays, or the like. The memory device 56 may be any tangible, non-transitory, computer readable medium that is capable of storing instructions executable by the processor 54 and/or data that may be processed by the processor 54. For example, the memory device 56 may include volatile memory, such as random access memory, or non-volatile memory, such as hard disk drives, read-only memory, optical disks, flash memory, and the like. The memory device 56 may be configured to store information such as a minimum turning radius of the work vehicle, a rate of change of a steering angle, a maximum speed of the work vehicle, a tire/track size of the work vehicle, a length of the work vehicle, a number of swaths of a main region of the work area, a width and a length of each swath of the main region, a boundary for each swath of the main region, a number of headland swaths, a width and a length of each headland swath, a boundary for each headland swath, etc.

Communication circuitry 58 is communicatively coupled to the controller 30. The communication circuitry 58 may be configured to output and receive signals from a field controller 32 and/or a base station controller 34. In some embodiments, the vehicle controller 40 may be configured to determine the end-of-row turn path for the work vehicle based at least in part on a signal 90 from the base station controller 34 or the field controller 32 of the work vehicle control system 40. In some embodiments, the field controller 32 is configured to direct a plurality of work vehicles through the field. As described above, the vehicle control system 40 includes communications circuitry. The communications circuitry 58 is configured to establish a communication link with a transceiver 92 of the base station 36, a transceiver of the field controller 32, and/or a transceiver of another work vehicle, thereby facilitating communication between the base station controller 34/field controller 32/other work vehicle and the vehicle controller 30 of the work vehicle. The communications circuitry 58 and the transceiver 92 may operate at any suitable frequency range within the electromagnetic spectrum. For example, in certain embodiments, the communications circuitry and/or transceiver may broadcast and receive radio waves within a frequency range of about 400 MHz to about 6 GHz. In addition, the communications circuitry 58 and/or transceiver 92 may utilize any suitable communication protocol, such as a standard protocol (e.g., Wi-Fi, Bluetooth, etc.) or a proprietary protocol.

In the illustrated embodiment, the navigation system 44 is in direct communication with (e.g., wired to) the vehicle controller 30. However, in some embodiments, the navigation system 44 may be in communication with the vehicle controller 30 via the communication circuitry 58. In the illustrated embodiment, the navigation system includes a spatial locating device 60. For example, the spatial locating device 60 may include a Global Navigation Satellite System (GNSS) receiver configured to receive signals from two or more satellites in orbit (e.g., GPS, GLONASS, Galileo, BeiDou, etc.) to determine the position, heading, speed, etc. of the work vehicle 12. The spatial locating device 70 may include a processor 62 and a memory component 64. The processor 62 may execute software stored on the memory component 64 to determine the position of the vehicle. Based on the determined position, the processor 62 may also determine a vehicle heading, speed, relative location of the work vehicle in the work area, etc. The navigation system 44 may output a navigation signal 66 including the vehicle heading, speed, relative location, etc. to the vehicle controller. In some embodiments, the vehicle controller 42 may determine (e.g., via the processor 54) the relative location of the work vehicle in the work area (e.g., relative location to one or more rows or swaths, one or more boundaries, one or more headlands, etc.) based on the navigation signal 66. Further, based at least in part on the relative location of the work vehicle, the vehicle controller 30 may determine the path for the work vehicle along a first main swath and an end-of-row turn path to a second main swath within the main region of the work area.

The vehicle speed system 46 may control the speed of the work vehicle 12 in the direction of travel along the path. The vehicle speed system 46 may be configured to control one or more of the throttle, the clutch, the brakes, and/or the transmission to control the speed of the work vehicle. In the illustrated embodiment, the speed control system 46 includes an engine output control system 70, a transmission control system 72, and a braking control system 74. The engine output control system 70 is configured to vary the output of an engine to control the speed of the work vehicle 12. For example, the engine output control system 70 may vary a throttle setting of the engine, a fuel/air mixture of the engine, a timing of the engine, and/or other suitable engine parameters to control engine output. In addition, the transmission control system 72 may adjust gear selection within a transmission to control the speed of the work vehicle 12. For example, the transmission control system 72 cause changing of gears or a gear ratio of the transmission to control the speed of the work vehicle. The transmission may include a number of fixed gear ratios or a continuously variable gear ratio. Furthermore, the braking control system 74 may adjust braking force, thereby controlling the speed of the work vehicle 12 (e.g., slow the work vehicle down at the end of a swath to enable the work vehicle to execute a turn). While the illustrated vehicle speed system 46 includes the engine output control system 70, the transmission control system 72, and the braking control system 74, alternative embodiments may include any of these systems, in any suitable combination. Further embodiments may include a vehicle speed system 46 having other and/or additional systems to facilitate adjusting the speed of the work vehicle. The vehicle speed system 46 may be controlled by the operator in a manual mode of operation. In an automatic or semi-automatic mode of operation, the vehicle speed system 46 may be controlled automatically or semi-automatically by the vehicle controller 30.

The vehicle steering system 48 may control the direction of travel of the work vehicle. In the illustrated embodiment, the vehicle steering system 48 includes a wheel angle control system 76, a differential braking system 78, and a torque vectoring system 80. The wheel angle control system 76 may automatically rotate one or more wheels or tracks of the work vehicle (e.g., via mechanical or hydraulic actuators) to steer the work vehicle along the path. By way of example, the wheel angle control system 76 may rotate front wheels/tracks, rear wheels/tracks, and/or intermediate wheels/tracks of the work vehicle, either individually or in groups. In some embodiments, the wheel angle control system 76 may hydraulically actuate the wheels/tracks rather than, or in addition to, mechanically actuating the wheels/tracks (e.g., via gears). A hydraulically actuated wheel angle control system 76 may enable the work vehicle 12 to turn without corresponding movement of a steering wheel (or other steering input device) inside the cab during an automatic or semi-automatic drive mode. The differential braking system 78 may independently vary the braking force on each side of the work vehicle to direct the work vehicle along the path. Similarly, the torque vectoring system 80 may differentially apply torque from the engine to wheels and/or tracks on each lateral side of the work vehicle, thereby directing the work vehicle along the path. In some embodiments, steering may be accomplished by varying the speed of wheels or tracks on either lateral side of the work vehicle. While the illustrated vehicle steering system 48 includes the wheel angle control system 76, the differential braking system 78, and the torque vectoring system 80, alternative embodiments may include any of these systems, in any suitable combination. Further embodiments may include a vehicle steering system 48 having other and/or additional systems to facilitate directing the work vehicle along the path (e.g., an articulated steering system, etc.). The vehicle steering system 48 may be controlled by the operator in a manual mode of operation. In an automatic or semi-automatic mode of operation, the vehicle steering system 48 may be controlled automatically by the vehicle controller. For example, in a semi-automatic mode of operation, the steering system 48 may be automatically controlled by the vehicle controller 42, and the speed system 46 may be controlled by the operator. In a fully automatic mode of operation, both the speed system 46 and the steering system 48 may be controlled by the vehicle controller. The vehicle steering system 48 may configured to receive a guidance signal from the vehicle controller, base station controller, and/or field controller, and automatically steer the work vehicle to implement an end-of-row turn based on the guidance signal.

The user interface 52 may be disposed inside the cab of the work vehicle and be configured to display information for, and receive inputs from, an operator. In some embodiments, the user interface 52 and the vehicle controller may be disposed within the same housing. The user interface 52 includes a display 85 configured to display information (e.g., instructions to implement the end-of-row-turn) for the operator based at least in part on the guidance signal received from the vehicle controller. The display 85 may include a screen, an array of LEDs, a series of gauges, a combination thereof, or some other arrangement. The user interface 52 also includes an operator input device 86 that enables the operator to input information. The operator input device 86 may include a keyboard, a series of buttons, a joystick, a mouse, a track pad, etc. In some embodiments, the display 85 and the operator input 86 may be a single component (e.g., a touchscreen). In some embodiments, the user interface includes a countdown system configured to indicate a countdown for initiating a turn of the work vehicle at a start of the end-of-row turn path. The countdown system may be displayed via the display 85. In another embodiment, the countdown system is configured to output an audible tone or sound, via an audio output device 88 (e.g., a speaker), to indicate the countdown for the operator.

Based on operator inputs received from the user interface 52, from the navigation system 44, from other sensors disposed throughout the system 40, from inputs stored in the memory device 56, or a combination thereof, the vehicle controller 30 may determine an end-of-row turn path for the work vehicle, and in some embodiments, automatically or semi-automatically control the steering system 48 and/or the speed system 46 to guide the work vehicle along the path. For example, the processor 54 of the vehicle controller 30 may determine an end-of-row turn path based at least in part on the relative location of the work vehicle received from the navigation system 44 and a minimum turning radius of the work vehicle received from the memory device 56. Further, the processor 54 may be configured to determine the end-of-row turn path to reduce a distance traveled along untracked portions of the headland region. The vehicle controller 30 may be configured to output instructions to implement the end-of-row turn, via a guidance signal 68, to the vehicle steering system 48, the vehicle speed system 46, the user interface 52, other suitable system(s), or a combination thereof.

In some embodiments, the headland region includes multiple headland swaths, in which crops may be planted in each headland swath. In such embodiments, the vehicle controller 30 is configured to select a target headland swath for the end-of-row turn. For example, the vehicle controller 30 may be configured to determine a potential end-of-row turn path for each of the headland swaths, such that each potential path follows a portion of the respective headland swath. To reduce overall soil compaction in the headland region and increase the efficiency of the agricultural operation, the vehicle controller 30 may be configured select the target headland swath corresponding to a potential end-of-row path that causes the work vehicle to travel along the least amount of untracked work area in the headland region.

Figure 3:
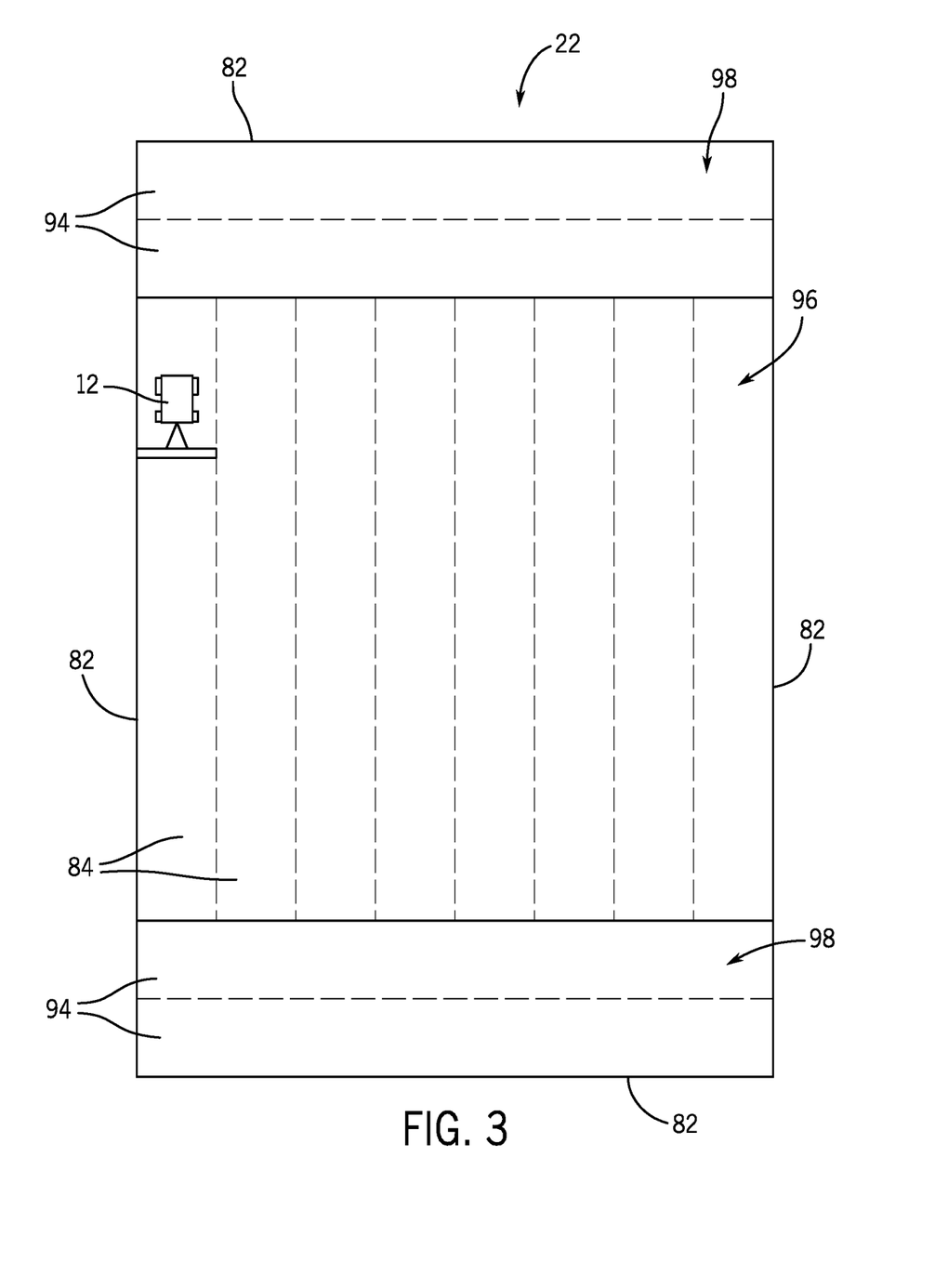
FIG. 3 is a schematic view of an embodiment of a work vehicle in a work area.

FIG. 3 is a schematic view of an embodiment of the work vehicle 12 in a work area 22 (e.g., field). The work area may be defined by a boundary 82. The boundary 82 may be a physical boundary (e.g., a fence, a creek, a ravine, etc.) or a virtual boundary that defines the work area. The work area 22 includes a main region 96 and at least one headland region 98. The main region includes swaths 84 (e.g., rows) in which agricultural product is planted. Though the swaths 84 depicted in FIG. 3 are straight, in some applications, the swaths 84 may be curved. In some embodiments, curved swaths 84 may be useful in work areas 22 having curved boundaries 82, curved geographical features, terraces, etc. Furthermore, though the swaths 84 shown in FIG. 3 are parallel to one another, the swaths 84 need not be parallel to one another to utilize the disclosed techniques. In the illustrated embodiment, the work area 22 has two headland regions 86. The headland regions 86 (e.g., headlands) are disposed at the ends of the swaths 84 to facilitate end-of-row turns by the work vehicle 12. In some embodiments, the headlands may be disposed in other locations. Each headland 86 may include multiple headland swaths 94 that are substantially perpendicular to the swaths 84. In some embodiments, the headlands 86 are used to grow agricultural product along the headland swaths 94.

Figure 4:
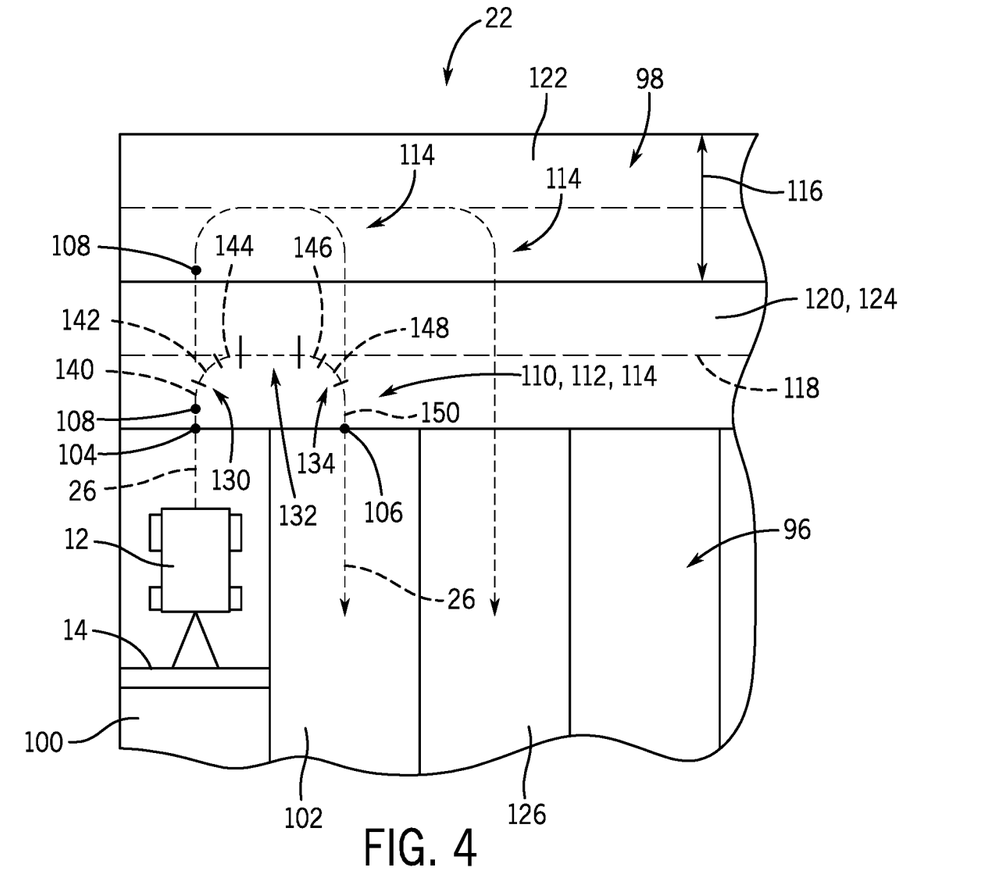
FIG. 4 is a schematic view of embodiments of end-of-row turn paths for the work vehicle.

FIG. 4 is a schematic view of embodiments of end-of-row turn paths for the work vehicle 12. The work vehicle 12 may be automatically, semi-automatically, or manually controlled by the operator to follow the path 26 along the first main swath 100 and the second main swath 102 of the main region 96. Upon reaching an end point 104 of the first main swath, the work vehicle may execute an end-of-row turn 110 (e.g., follow an end-of-row turn path 112) from the end point 104 of the first main swath 100 to a starting point 106 of the second main swath 102 of the main region 96. However, in some embodiments, the work vehicle 12 may be configured to execute the end-of-row turn 110 at a first turn starting point 108 disposed in the headland region 98. In some embodiments, the first turn starting point 108 is disposed between a center 118 of a first headland swath 120 and the end point 104 of the first main swath 100 of the main region 96. In another embodiment, the first turn starting point 108 is based on a relative orientation (e.g., perpendicular, eighty degree offset, etc.) of the first headland swath 120 to the first main swath 100. For example, the end-of-row turn path 112 for a first headland swath 120 that is perpendicular to the first main swath 100 causes the vehicle to make a ninety degree turn over the end-of-row turn path 112, whereas, the end-of-row turn path 112 for a first headland swath 120 that is offset from the first main swath 100 by eighty degrees only cause the vehicle to make an eighty degree turn over the end-of-row turn path 112. In some embodiments, the control system may cause the work vehicle 12 to turn at a maximum turn angle; however, making a turn at the maximum turn angle for a ninety degree turn will take longer than for an eighty degree turn. Thus, the control system may adjust the starting point 108 of the end-of-row turn path 112 for the ninety degree turn to be positioned before the starting point 108 for the eighty degree turn. The end-of-row turn 110 may cause the work vehicle 12 to travel in the headland region 98. In some embodiments, the end-of-row turn 110 causes the work vehicle 112 to travel along a portion of one or more headland swaths. In another embodiment, the end-of-row turn path 112 causes the work vehicle 12 to travel along the one or more headland swaths and turn toward a third main swath 126 of the main region 96.

In some embodiments, the agricultural implement 14 may be raised, deactivated, or otherwise disengaged, via an implement controller, during the end-of-row turn and/or while the work vehicle 12 and/or the agricultural implement 14 travel along the headland region 98. The vehicle controller may be configured to output a tool control signal at an end point of a swath (e.g., end point of the first main swath 104). The implement controller may be configured to receive the tool control signal and automatically raise, deactivate, or otherwise disengage the agricultural implement 14 based at least in part of the tool control signal. In another embodiment, the operator may raise, deactivate, or otherwise disengage the agricultural implement via the user interface 52. In another embodiment, the vehicle controller is configured to inform the operator of a planned turn, via the user interface 52 and wait for approval from the operator before automatically implementing the planned turn. The end-of-row turn may include one or more other operator-triggered actions (e.g., varying engine speed, turning PTO off or on, raising markers, folding the implement, turning hydraulic remotes off or on, etc.), some of which may or may not affect the speed of the vehicle 12. The work vehicle 12 then follows the end-of-row turn path 112 to the starting point 106 of the second main swath 102. The implement 14 is then lowered, activated, or engaged via the vehicle controller and implement controller, and the work vehicle 12 proceeds along the second main swath 102. In certain embodiments, the implement controller may be omitted and the vehicle controller may control the implement.

As described above, the vehicle controller may determine the end-of-row turn path 112 from the end point 104 of the first main swath 100 or first turn starting point 108 to the starting point 106 of a second main swath 102 of the main region 96. The end-of-row turn path 112 may include a first turn segment 130 configured to generally direct the work vehicle 12 to turn from the first main swath 100 of the main region 96 to a corresponding headland swath and a second turn segment 134 configured to direct the work vehicle 12 to turn from the corresponding headland swath to the second main swath 102 of the main region 96. In some embodiments, the end-of-row turn path 112 includes a traversing segment 132 executed by the work vehicle 12 after the first turn segment 130 and before the second turn segment 134. The traversing segment 132 is configured to direct the work vehicle 12 along the corresponding headland swath in a direction generally toward the second main swath 102. In some embodiments, the corresponding headland swath is substantially straight; thus, the traversing segment 132 causes the work vehicle 12 to move in a substantially straight direction. The traversing segment 132 may cause the work vehicle 12 to move along a length of the corresponding headland swath while maintaining the work vehicle 12 in a centered position with respect to a width 116 of the corresponding headland swath.

The first turn segment 130 may have a turning portion 140, a transition portion 142, and a straightening portion 144. The turning portion 140 is configured to decrease a radius of curvature of the first turn segment 130, the transition portion 142 is configured to maintain a constant radius of curvature of the first turn segment 130, and the straightening portion 144 is configured to increase the radius of curvature of the first turn segment 130. In some embodiments, the straightening portion 144 is configured to increase the radius of curvature of the first turn segment 130 until the end-of-row path 112 transitions from turning the work vehicle 12 to directing the work vehicle 12 in a substantially straight direction along the traversing segment 132.

In some embodiments, the radius of curvature of the first turn segment 130 is limited by the maximum rate of change of the curvature for the work vehicle 12. Although, a lower radius of curvature may turn the work vehicle 12 at a higher rate than a higher radius of curvature, the radius of curvature may have a minimum radius of curvature based at least in part on the maximum rate of change of the curvature for the work vehicle 12. The vehicle controller may receive the maximum rate of change of the curvature for the work vehicle from the memory device and determine the radius of curvature of the first turn segment 130 based on the maximum rate of change of the curvature for the work vehicle 12 such that the work vehicle 12 may be able to implement the first turn segment 130.

In some embodiments, the radius of curvature of the first turn segment 130 is also limited by lateral forces on the work vehicle along the first turn segment 130. The lateral forces may cause the work vehicle 12 to slide and/or tip. The lateral forces are based on the speed of the work vehicle 12 and the radius of curvature of the first turn segment 130. For example, a first turn segment 130 having a small radius of curvature may cause the work vehicle 12 to slide out of the end-of-row turn path 112 into an untracked portion of the headland region 98 when the work vehicle 12 is moving above a certain speed. To avoid causing the work vehicle to slide and/or tip, the control system may determine the radius of curvature of the first turn segment 130 based on the speed of the work vehicle 12 and the radius of curvature of the first turn segment 130.

In some embodiments, the turning portion 140 may be configured to decrease the radius of curvature based on the maximum rate of change of curvature for the work vehicle 12 to a minimum radius of curvature for the work vehicle 12 to reduce a distance sufficient to turn the work vehicle 12. Further, the straightening portion 144 may increase the radius of curvature from the transition portion 142 to the traversing segment 132 of the headland swath at the maximum rate of change of curvature for the work vehicle 12 to reduce the distance sufficient to straighten the work vehicle 12 (e.g., align the work vehicle with the headland swath). The distance along the transition portion 142 may be based on the maximum rate of change of curvature for the work vehicle 12. For example, a higher maximum rate of change of curvature for the work vehicle 12 may cause the turning and straightening portions to be shorter and the transition portion to be longer, which reduces the overall distance (e.g., combined distance along the turning portion 140, the transition portion 142, and the straightening portion 144) to turn the work vehicle 144. The work vehicle controller may be configured to determine the first turn segment 130 of the end-of-row path 112 that has a shortest overall distance sufficient to turn the work vehicle 12.

In another embodiment, the work vehicle controller may be configured to determine the first turn segment 130 of the end-of-row path 112 having a shortest overall distance sufficient to move the work vehicle 12 along untracked portion(s) (e.g., portions that the work vehicle has not already moved along or portions that the work vehicle will not move along) of the headland region 98 and/or work area 22. For example, the work vehicle 12 may have already moved along a portion of the headland region 98 proximate the first main swath 100. Although another potential first turn segment may have a shorter overall distance to turn the work vehicle, the work vehicle controller may determine a different first turn segment to direct the work vehicle 12 to move along the portion of the headland region 98 that the work vehicle 12 has already passed over to reduce the overall distance that the work vehicle 12 travels along untracked portions of the headland region 98.

In some embodiments, the second turn segment 134 has a second turning portion 146, a second transition portion 148, and a second straightening portion 150. The second turning portion 146 is configured to decrease a radius of curvature of the second turn segment 134, the second transition portion 148 is configured to maintain a constant radius of curvature of the second turn segment 134, and the second straightening portion 150 is configured to increase the radius of curvature of the second turn segment 134. In some embodiments, the second straightening portion 150 is configured to increase the radius of curvature of the second turn segment 134 until the end-of-row path 112 transitions from turning the work vehicle 12 to directing the work vehicle 12 in a substantially straight direction along the second main swath 102.

In some embodiments, the end-of-row path 112 has additional turn segments (e.g., third turn segment, etc.). In other embodiments, the end-of-row turn path 112 has one or more of the first turn segment 130, the traversing segment 132, and the second turn segment 134. For example, the end-of-row turn path 112 may have only a first turn segment 130. In such a path, the straightening portion 144 of the first turn segment may increase the radius of curvature of the first turn segment 130 until the end-of-row path 112 transitions from turning the work vehicle 12 to directing the work vehicle in a substantially straight direction along the second main swath 102.

In some embodiments, the headland region 98 has multiple headland swaths. To reduce overall soil compaction in the headland region and to increase the efficiency of the agricultural operation, the vehicle controller may be configured to select a first potential end-of-row path that traverses the first headland swath 120 or a second potential end-of-row path that traverses the second headland swath 122 based on which potential end-of-row path causes the work vehicle 12 to travel along the least amount untracked work area 22 in the headland region 98.

In some embodiments, the headland region 98 is used to grow agricultural crops. As headland swaths 94 may be tracked by the work vehicle 12 in the process of working the headland region 98, the vehicle controller may not include distance traveled by the work vehicle 12 along a headland swath 94 when determining the overall distance traveled by the work vehicle along the untracked work area (i.e., the vehicle controller may not include the traversing segment 132 when determining the overall distance traveled by the work vehicle along untracked work area). Instead, the vehicle controller may be configured to select the target headland swath 124 based on which of the potential end-of-row turn paths is configured to cause the work vehicle 12 to move along a smallest amount of untracked work area in the headland region 98 during the first turn segment 130 and the second turn segment 134. The work vehicle controller determine that the potential end-of-row turn path is configured to cause the work vehicle to move along the smallest amount of untracked work area based on both current and future untracked work area (e.g., untracked work area after future/planned end-of-row turns paths).

In some embodiments, the vehicle controller is configured to determine a potential end-of-row path 114 for each of the headland swaths 94 in the headland region 98. The vehicle controller may predict or determine an overall distance travelled along untracked work area for each of the headland swaths 94 based on information received from the navigation system, the memory device, etc. In some embodiments, the vehicle controller is configured to determine the potential end-of row turn paths 114 in real-time. However, in other embodiments, the vehicle controller or a remote controller is configured to determine a complete path for the vehicle (e.g., path for the entire work area that includes all end-of-row turns) before the work vehicle 12 enters the work area 22, such that the vehicle controller or the remote controller may determine the overall distance travelled along untracked work areas based on current tracked/untracked work area, as well as predicted tracked/untracked work area. The vehicle controller or the remote controller may select potential end-of-row path based at least in part on which of the headland swaths 94 has the least overall distance travelled along untracked work area. In another embodiment, the vehicle controller or the remote controller may select the potential end-of-row path based at least in part on which potential end-of-row path has the least overall distance travelled along the untracked work area during the first turn segment 130 and the second turn segment 134. In some embodiments, the work vehicle controller is configured to select the headland swath positioned further away from the main region 96 when the work vehicle 12 cannot make a turn to the headland swath closer to the main region 96 due to soil conditions, the maximum turn rate limit, and/or radius of curvature limit of the work vehicle 12. In another embodiment, the work vehicle controller may be configured to select the headland swath positioned further away from the main region so that the agricultural implement 14 has time to disengage/re-engage between the end point 104 of the first main swath 100 and the starting point 106 of the second main swath 102.

As set forth above, in some embodiments, the agricultural implement 14 may be activated in the headland region 98 to perform work on crops planted in the headland region 98. The agricultural implement 14 may be activated along the headland swath. The work vehicle controller may be configured cause the work vehicle 12 to travel along each of the headland swaths 94 at least once along the complete path for the work vehicle 12, such that the agricultural implement 14 performs work on the crops of each of the headland swaths. Thus, the work vehicle controller may select potential end-of-row turn paths that cause the complete path to have the least overall distance travelled along the untracked work area or the least overall distance travelled along the untracked work area during the first turn segment(s) 130 while still travelling along each of the headland swaths at least once along the complete path.

Figure 5:
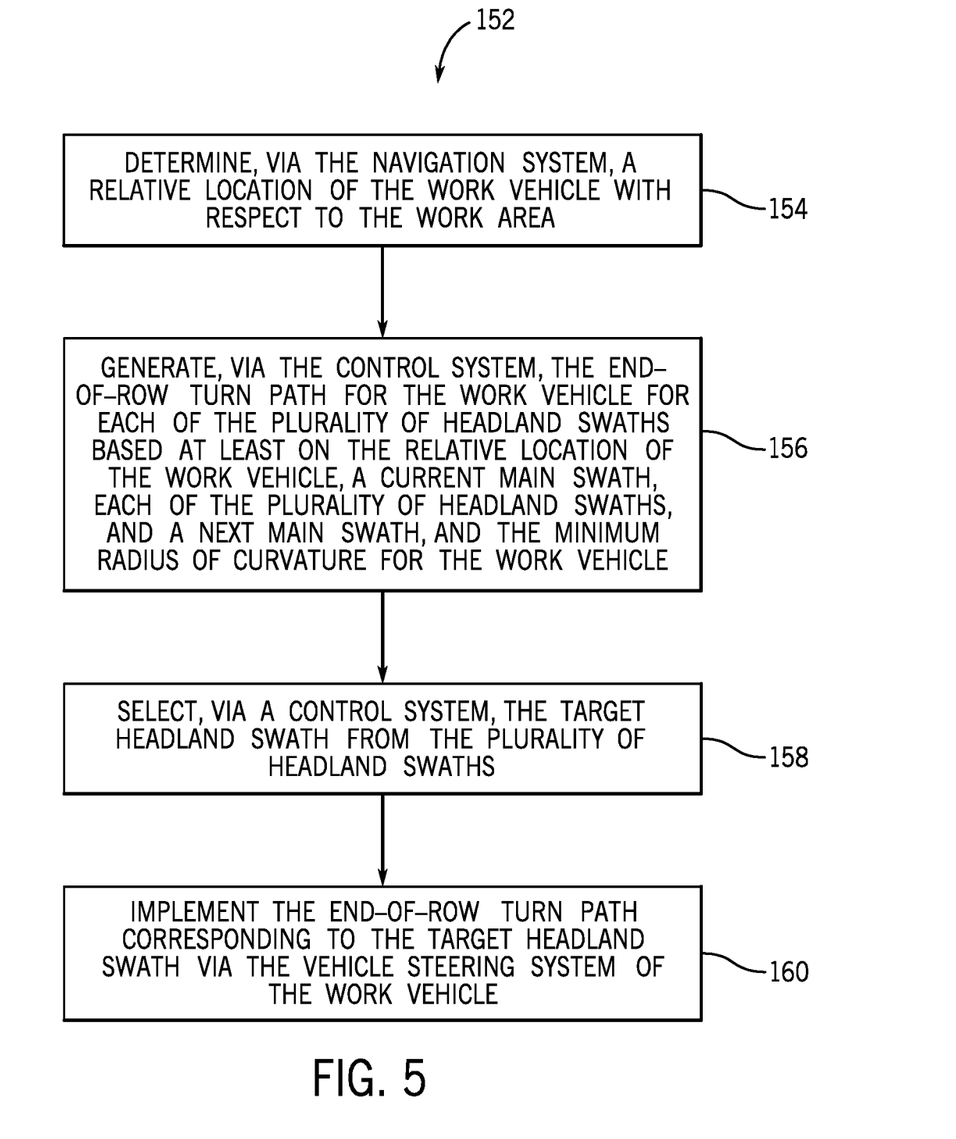
FIG. 5 is a flow chart of an embodiment of a method for generating, selecting, and implementing an end-of-row turn for the work vehicle.

FIG. 5 is a flow chart of an embodiment of a method 152 for generating, selecting, and implementing an end-of-row turn for the work vehicle. The method includes the step of (block 154) determining, via the navigation system, the relative location of the work vehicle with respect to the work area (e.g., the location of the work vehicle in the field). As discussed above, the work area includes the headland region and a main region, the main region includes multiple main swaths, and the headland region may include multiple headland swaths.

The method further includes the step (block 156) of determining, via the control system, a potential end-of-row turn path for the work vehicle for each of the headland swaths based at least on the relative locations of the work vehicle, a current main swath (e.g., the first main swath), each of the headland swaths, and a next main swath (e.g., the second main swath) and the minimum radius of curvature for the work vehicle. Each potential end-of-row turn path has a first turn segment configured to direct the work vehicle to turn from the current main swath of the multiple main swaths to a corresponding headland swath of the headland region, a traversing segment configured to direct the work vehicle to travel along the corresponding headland in a direction toward the next main swath of the multiple main swaths, and a second turn segment configured to direct the work vehicle to turn from the corresponding headland swath to the next main swath.

The method also includes the step of (block 158) selecting, via a control system, one of the potential end-of-row turn paths. As discussed above, the vehicle controller may select one of the potential end-of-row turn paths based at least in part on which of the potential end-of-row turn paths has the least overall distance travelled along untracked work area, or may select one of the potential end-of-row turn paths based at least in part on which of the potential end-of-row turn paths has the least overall distance travelled along untracked work area during the first turn segment and the second turn segment. However, in some embodiments, the work vehicle controller may select the potential end-of-row turn paths corresponding to the headland swath positioned further away from the main region 96 when the work vehicle 12 cannot make a turn to the headland swath closer to the main region 96 due to the maximum rate of change of the curvature/or minimum radius of curvature for the work vehicle 12. Further, the method includes the step of (block 160) implementing the end-of-row turn path corresponding to the selected potential end-of-row turn paths via the vehicle steering system and/or the vehicle speed system of the work vehicle.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A work vehicle guidance system, comprising:
a control system comprising a controller having a processor and a memory, wherein the control system is configured to:
determine a relative location of a work vehicle to a work area;
determine an end-of-row turn path for the work vehicle based at least on the relative location of the work vehicle and a minimum turning radius of the work vehicle, wherein the end-of-row turn path is configured to direct the work vehicle to turn at a first turn starting point from a first main swath of the work area to a headland swath of the work area, travel along the headland swath in a direction toward a second main swath of the work area, and turn from the headland swath to the second main swath, wherein the first turn starting point disposed between an end point of the first main swath and a center of the first headland swath, and wherein the first turn starting point is determined and varies based at least on a relative orientation of the first headland swath to the first main swath; and
output a guidance signal comprising guidance instructions to implement the end-of-row turn path.

2. The work vehicle guidance system of claim 1, comprising a work vehicle steering system configured to control a direction of travel of the work vehicle, wherein the work vehicle steering system is configured to receive the guidance signal and to implement the end-of-row turn path based at least on the guidance signal.

3. The work vehicle guidance system of claim 1, wherein the control system comprises a work vehicle control system disposed on the work vehicle.

4. The work vehicle guidance system of claim 1, wherein the control system comprises a field controller.

5. The work vehicle guidance system of claim 4, wherein the field controller is configured to control a plurality of work vehicles concurrently.

6. The work vehicle guidance system of claim 1, comprising a navigation system configured to determine an absolute location of the work vehicle and to output a navigation signal, wherein the control system is configured to receive the navigation signal from the navigation system and to determine the relative location of the work vehicle with respect to the work area based on the navigation signal.

7. The work vehicle guidance system of claim 6, wherein the navigation system comprises a global positioning system (GPS) configured to determine the absolute location of the work vehicle.

8. The work vehicle guidance system of claim 1, comprising a user interface configured to receive the output guidance signal and to provide an indication of the guidance instructions to an operator.

9. The work vehicle guidance system of claim 8, wherein the user interface comprises a countdown mechanism configured to indicate a countdown for initiating a planned turn of the work vehicle at a start of the end-of-row guide path.

10. The work vehicle guidance system of claim 1, wherein the control system is configured to output a tool control signal comprising tool control instructions to disengage an implement tool during at least a portion of the end-of-row turn path.

11. A method for guiding a work vehicle, comprising the steps of:
determining, via a navigation system, a relative location of the work vehicle with respect to a work area;
determining, via a control system, an end-of-row turn path for the work vehicle based at least on the relative location of the work vehicle and a minimum turning radius of the work vehicle, wherein the end-of-row turn path comprises at least a first turn segment, a traversing segment, and a second turn segment, wherein the first turn segment is configured to direct the work vehicle to turn from a first main swath of the work area to a headland swath of the work area, the traversing segment is configured to direct the work vehicle to travel along the headland swath in a direction toward a second main swath, and the second turn segment is configured to direct the work vehicle to turn from the headland swath to the second main swath of the work area;
implementing the end-of-row turn path via a vehicle steering system of the work vehicle; and
executing the end-of-row turn at a first turn starting point disposed between an end point of the first main swath and a center of the first headland swath, wherein the first turn starting point is determined and varies based at least on a relative orientation of the first headland swath to the first main swath.

12. The method of claim 11, wherein the first turn segment comprises a turning portion, a transition portion, and a straightening portion, wherein the turning portion is configured to decrease a radius of curvature of the first turn segment, the transition portion is configured to maintain a constant radius of curvature of the first turn segment, and the straightening portion is configured to increase the radius of curvature of the first turn segment.

13. The method of claim 12, wherein the transition portion has a radius of curvature substantially equal to the minimum turning radius of the work vehicle.

14. The method of claim 12, wherein a length of each of the turning portion and the straightening portion is based at least on a rate of change of curvature for the work vehicle, and the control system is configured to implement a maximum rate of change of curvature to reduce the length of each of the turning portion and the straightening portion.

15. The method of claim 11, wherein the end-of-row turn path is based on a maximum rate of change of curvature for the work vehicle.

16. A method for guiding a work vehicle, comprising the steps of:
determining, via a navigation system, a relative location of the work vehicle with respect to a work area, wherein the work area comprises a headland region and a main region, the main region comprises a plurality of main swaths, and the headland region comprises a plurality of headland swaths;
determining, via a control system, a potential end-of-row turn path for the work vehicle for each of the plurality of headland swaths based at least on the relative locations of the work vehicle, a current main swath, each of the plurality of headland swaths, and a next main swath and a minimum radius of curvature for the work vehicle, wherein each potential end-of-row turn path comprises a first turn segment configured to direct the work vehicle to turn from the current main swath of the plurality of main swaths to a corresponding headland swath of the plurality of headland swaths, a traversing segment configured to direct the work vehicle to travel along the corresponding headland in direction toward the next main swath of the plurality of main swaths, and a second turn segment configured to direct the work vehicle to turn from the corresponding headland swath to the next main swath;

selecting, via the control system, one of the potential end-of-row turn paths;

implementing the one of the potential end-of-row turn paths via a vehicle steering system of the work vehicle; and executing the end-of-row turn at a first turn starting point disposed between an end point of the first main swath and a center of the first headland swath, wherein the first turn starting point is determined and varies based at least on a relative orientation of the first headland swath to the first main swath.

17. The method of claim 16, wherein the one of the potential end-of-row turn paths is configured to cause the vehicle to move along the least amount of untracked work area during the first turn segment and the second turn segment.

18. The method of claim 16, wherein the one of the potential end-of-row turn paths is based on a maximum rate of change of curvature for the work vehicle.

* * * * *